Patented July 15, 1952

2,603,626

UNITED STATES PATENT OFFICE 2,603,626

LOW-TEMPERATURE POLYMERIZATION PROCESS EMPLOYING $P_2O_5$ TREATED ALKYL HALIDE CATALYST SOLVENT

John J. Kolfenbach, Somerville, N. J., and Augustus B. Small, Baton Rouge, La., assignors to Standard Oil Development Company, a corporation of Delaware No Drawing. Application March 19, 1949, Serial No. 82,494

8 Claims. (Cl. 260—85.3)

This invention relates to a low temperature polymerization process wherein an isoolefin and a polyolefin are polymerized to form interpolymers and more particularly relates to purifying the alkyl chloride to be used as a catalyst solvent and/or as a diluent in the low temperature polymerization reaction.

It is known to produce an interpolymer of an isoolefin such as isobutylene with a polyolefin such as butadiene at temperatures ranging from —20 to —165° C. by the application thereto of Friedel-Crafts catalysts, preferably in solution in a low freezing, non-complex forming solvent. The reaction yields solid, rubber-like polymers of high molecular weight that are reactive with sulfur in a curing reaction which is in some ways analogous to the vulcanization of rubber.

To produce this polymer, isobutylene is one of the preferred components, but other isoolefins such as 2-methyl butene-1; 2-methyl pentene-1, or 2-methyl hexene-1; or the like may be used. 99 to 40 weight percent of the isoolefin is mixed with 1 to 60 weight percent of a polyolefin having 4 to 12 carbon atoms per molecule such as butadiene or isoprene. Other polyolefins which may be used are piperylene; dimethyl butadiene; cyclo pentadiene; dimethallyl, or myrcene. For most purposes the conjugated diolefins having from 4 to 6 carbon atoms per molecule are preferred. The olefinic mixture, usually diluted with 1 to 3 volumes of inert diluent such as a low-freezing halogenated alkane or alkane hydrocarbon per volume of mixture, is cooled to a temperature within the range from —20° C. to —100° C., or even as low as —165° C., by the use of a refrigerating jacket around the reactor or by admixture with the polymerizable olefins of a refrigerant-diluent such as liquid propane, liquid ethane, liquid ethylene or even liquid methane. Alternatively, solid carbon dioxide may be added to the reaction mixture to cool it to the required temperature.

The polymerization is caused to occur by application to the cold reaction mixture of a Friedel-Crafts metal halide catalyst dissolved in an organic solvent which does not form a complex with the catalyst and which is liquid at the polymerization temperature.

The Friedel-Crafts catalyst may be aluminum chloride, aluminum bromide, boron fluoride, double salts ranging in composition from aluminum dichloro bromide to dialuminum pentabromo chloride, aluminum bromide-aluminyl bromide, titanium tetrachloride, titanium chloroacetate, hydroxylated aluminum halides and other known active Friedel-Crafts halogen compounds or their equivalents. Also many of these catalysts may be used in the form of complexes such as aluminum alkoxide-aluminum chloride, or complexes of active Friedel-Crafts halides with ethers or with aromatic compounds.

For the solvent, substantially any of the lower mono- or polyhalogenated alkanes having freezing points below about —10° C., as well as carbon disulfide, may be used. Methyl chloride, methyl bromide, dichloro methane, ethyl chloride and the like are particularly useful. Hydrocarbon solvents such as butane are also eminently suited with some of the aforesaid catalysts, notably with aluminum bromide.

The catalyst solution is conveniently applied to the cold mixed olefinic material in the form of a spray delivered onto the surface of the rapidly stirred olefinic mixture. Alternatively, the catalyst solution may be delivered as a jet into a zone of high turbulence in the olefinic material in any convenient way or it may be delivered in any convenient manner which obtains a rapid dispersion of the catalyst solution into the cold olefinic mixture. The concentration of the catalyst in the solution may vary between 0.05% and 14.0% and the rate of addition of catalyst may vary between 0.05% to 5% based on reactor content per minute. By adding more catalyst over a longer period of time than that given in the subsequent illustrative example a larger conversion will be obtained. The polymerization proceeds rapidly to yield a solid polymer having a Staudinger molecular weight which may vary between about 20,000 and 100,000; the lower the polymerization temperature the higher the molecular weight, all other factors being equal.

The polymer is brought up to room temperature from the temperature of the polymerization mixture in any convenient manner, although the preferred procedure is to dump the reaction mixture into warm water or a warm alkaline aqueous solution or warm alcohol or the like to flash off remaining monomers and other volatile ingredients of the reaction mixture, quench the catalyst and start the purification of the polymer. The polymer is then washed on an open roll mill with clear water to obtain a further purification but it may, if desired, be purified in many other ways.

In utilizing the polymer, it is desirably compounded with a wide range of substances including zinc oxide, stearic acid, carbon black and various other pigments, fillers and protective and improving agents.

In the preparation of rubber materials from an isoolefin such as isobutylene and a polyolefin such as butadiene using a Friedel-Crafts catalyst it is important that catalysts poisons or catalyst contaminants be removed from the starting products and from the diluent and solvent. These poisons or contaminants exert a marked effect upon the polymerization reaction even when these contaminants or poisons are present in extremely low concentrations. If sufficient of these contaminants are present it is impossible to carry out the polymerization reaction to produce rubbery materials. Treatment of the catalyst solvent and/or feed diluent with solid phosphoric anhydride has been shown to improve the quality of the catalyst solvent and feed diluent but considerable difficulty is encountered in handling phosphoric anhydride in the solid state in view of its hydgroscopic and corrosive character.

The present invention relates to a method whereby the alkyl halides may be purified by treating with a solution of phosphoric anhydride in a phosphate ester as for example tributyl phosphate. The solution has the advantage of removing contaminants from the alkyl halides but does not have the objectionable features encountered in handling phosphoric anhydride powder. Also as an added advantage the process effects improved contact between the phosphoric anhydride and alkyl chloride because the methyl chloride is soluble in the solution used as treating agent.

As above pointed out the ordinary or technical grade halogenated alkanes contain contaminants or poisons for the catalyst used in the low temperature polymerization reaction. It is one of the features of this invention to remove such contaminants and poisons according to the process which is illustrated as follows:

Example 1

One liter of a solution containing 20 g. of phosphoric anhydride per 100 cc. of tributyl phosphate was placed in a bomb. 10 liters of technical grade methylene chloride (dichloromethane) were then added to the bomb and the mixture was stirred to insure homogeneity.

The bomb was then closed and the solution was heated to about 100° C. and was allowed to stand at this temperature for about 8 hours. After this treatment the methylene chloride was distilled from the bomb by merely opening the valve in the outlet line from the bomb. The vapors from the bomb were condensed to recover purified methylene chloride. Under these conditions the only material coming overhead as a vapor was the methylene chloride. The phosphoric anhydride and the tributyl phosphate remained behind in the bomb. The above example is given as one way of carrying out the purifying step but the method may be used for purifying other halogenated alkanes, and the specific procedure described may be modified in many ways as will be apparent to those skilled in the art. For example, instead of 20 g. of phosphoric anhydride per 100 cc. of tributyl phosphate about 1 g. to 30 g., and preferably 10 to 25 g. of the phosphoric anhydride may be used per 100 cc. of tributyl phosphate. Other organic solvents which may be similarly treated include halogenated alkanes having 1 to 3 carbon atoms per molecule, and preferably those having a freezing point below —10° C., such as methyl, ethyl or propyl chloride, dichloroethane, the corresponding brominated alkanes, dichlorodifluoromethane, trichloromonofluoromethane, other mixed chlorofluoroalkanes and the like. Instead of heating to 100° C., the mixture may be heated in the range between about 50° C. and 120° C., and the time of heating may vary between about 1 and 20 hours, the lower times being used with the higher temperatures.

In the purification step the weight ratio of phosphoric anhydride to halogenated alkane may conveniently vary between about $1/100$ and $50/100$, and the volume ratio of phosphoric anhydride solution to halogenated alkane may be between about 2:100 and 5:1, preferably between 5:100 and 25:100.

Furthermore, instead of using tributyl phosphate as the solvent for the phosphoric anhydride, various other alkyl esters may be used. For example, good results can be obtained with triethyl phosphate, tri-2-ethylhexyl phosphate, tri-nonyl phosphate, tri-lauryl phosphate, and other alkyl esters. Also, instead of phosphate esters having three identical alcohol residues, acid or mixed phosphate esters may be used likewise. In general, liquid phosphate esters having alcohol residues containing 2 to 12 carbon atoms are suitable, neutral alkyl phosphates having 4 to 8 carbon atoms per alkyl group being preferred.

Finally, although the liquid reagent obtained by adding phosphoric anhydride to phosphate ester is spoken of herein as a solution, it is possible that the "solution" is actually a liquid reaction product obtained by reaction between the ester and the anhydride. It is conceivable, for example, that in reality the "solution" is an ester of pyrophosphoric or metaphosphoric acid rather than a simple solution. It will be understood, however, that the present invention does not depend on the theory underlying the formation of the liquid phosphoric anhydride reagent, but rather on the discovery that the liquid reagent described herein can be used effectively for purifying halogenated alkanes.

Example 2

A low-temperature polymerization using the purified methylene chloride obtained in Example 1 as feed diluent and catalyst solvent was carried out as follows:

A reaction mixture was prepared by mixing 970 milliliters of isobutylene, 30 milliliters of isoprene and 1000 milliliters of purified methylene chloride, and the mixture was externally refrigerated to —135° F. The polymerization was effected at atmospheric pressure by adding to the refrigerated feed a catalyst solution containing 0.42 gram of aluminum chloride per 100 milliliters of methylene chloride at a rate of 30 milliliters per minute for 7½ minutes. Thereafter, the resulting polymer was separated from the reaction mixture in the usual manner outlined in an earlier part hereof. 190 grams of polymer having a Staudinger molecular weight of 53,000 and a Mooney viscosity (1½ mins. at 212° F.) of 74. 100 parts of this polymer were compounded with 5 grams of zinc oxide, 3 grams of stearic acid, 2 parts of sulfur, 50 parts of easy processing channel black, 1.0 parts of tetramethyl thiuram disulfide, and 0.5 parts of mercaptobenzothiazole, and samples of the resulting compound were vulcanized at 310° F. for 20 and 40 minutes respectively. The vulcanizate had the following properties:

| Cure Time | Tensile Lbs./Sq. In. | Ultimate Elongation, Percent | Modulus at 400% Elong., Lbs./Sq. In. |
| --- | --- | --- | --- |
| 20 Minutes | 2,750 | 810 | 750 |
| 40 Minutes | 2,850 | 720 | 1,050 |

The above results indicate that the polymer obtained was a GR–I type rubber of good quality.

In contrast, when a similar polymerization was attempted using the same commercial methylene chloride as feed diluent and catalyst solvent, but without treating it in accordance with the invention, no polymerization at all took place.

This comparison illustrates that by means of the present invention methylene chloride can be adapted for use as a diluent and catalyst solvent in low temperature Friedel-Crafts polymerizations of GR–I type rubber, solid polyisobutylene, copolymers of isobutylene with styrene in accordance with the general procedure described in U. S. Patent 2,274,749, and similar polymers, whereas untreated commercial methylene chloride is entirely unsuited for this type of polymerization. And while other halogenated alkanes such as methyl and ethyl chloride, unlike methylene chloride, are available in commercial grades sufficiently pure to be operative in low-temperature, Friedel-Crafts polymerizations of the type described, improvements in operating efficiency and product quality can be obtained by applying the invention even to these materials.

While specific examples showing a purification process and a polymerization run in accordance with the present invention have been given herein, it is to be understood that this is by way of illustration only and various modifications and changes may be made without departing from the spirit of the invention.

We claim:

1. A process for purifying an impure halogenated alkane containing impurities which contaminate and poison Friedel-Crafts catalysts during polymerization reactions, containing 1 to 2 carbon atoms per molecule and having a freezing point below −10° C., which process comprises mixing the hologenated alkane with about 1 to 50 weight percent of a liquid containing 1 to 30 grams of phosphoric anhydride per 100 cc. of tributyl phosphate, maintaining the mixture in a closed zone while heating the mixture to an elevated temperature, maintaining the mixture at the elevated temperature for about 1 to 20 hours and recovering the purified halogenated alkane from the mixture.

2. A process for purifying methylene chloride of technical grade containing impurities which contaminate and poison Friedel-Crafts catalysts during polymerization reactions, which comprises mixing the methylene chloride with 5 to 25 volume percent of a solution containing 10 to 25 g. of phosphoric anhydride dissolved in 100 cc. of tributyl phosphate, maintaining the mixture at a temperature of about 100° C. for about 8 hours in a closed zone, and distilling off purified methylene chloride.

3. A process for purifying an impure halogenated alkane which comprises contacting the halogenated alkane with phosphoric anhydride dissolved in an alkyl phosphate and separating the purified halogenated alkane from the phosphoric anhydride solution.

4. A process for purifying an impure halogenated alkane having 1 to 3 carbon atoms per molecule, which comprises mixing 1 to 50 parts of the halogenated alkane with 100 parts of phosphoric anhydride dissolved in an alkyl phosphate having 2 to 13 carbon atoms per alkyl group and maintaining the mixture at a temperature between 50 and 120° C. for a period of 1 to 20 hours.

5. In a low temperature olefinic polymerization process in which a polymerization catalyst consisting of a Friedel-Crafts metal halide catalyst in solution in a halogenated alkane containing 1 to 3 carbon atoms per molecule and having a freezing point below −10° C., is used for the polymerization of an olefinic mixture, the improvement which consists of treating an impure halogenated alkane with a liquid containing 1 to 30 grams of phosphoric anhydride per 100 cc. of an alkyl phosphate, separating the treated halogenated alkane from the phosphoric anhydride solution, and thereafter dissolving in the treated halogenated alkane the Friedel-Crafts metal halide catalyst, and subsequently adding the resulting catalyst solution to said olefinic mixture and carrying out the polymerization at a temperature between −20° C. and −165° C.

6. In a low temperature olefinic polymerization process in which a polymerization catalyst consisting of a Friedel-Crafts metal halide catalyst in solution in a halogenated alkane containing 1 to 3 carbon atoms per molecule and having a freezing point below −10° C., is used for the polymerization of an olefinic mixture consisting of a poly-olefin having from 4 to 12 carbon atoms per molecule with an iso-olefin, the improvement which consists of treating an impure halogenated alkane with about 1 to 50 weight percent of a liquid containing 1 to 30 grams of phosphoric anhydride per 100 cc. of tributyl phosphate, separating the treated halogenated alkane from the phosphoric anhydride solution, and thereafter dissolving in the treated halogenated alkane the Friedel-Crafts metal halide catalyst, and subsequently adding the resulting catalyst solution to said olefinic mixture and carrying out the polymerization at a temperature between −20° C. and −165° C.

7. In a low temperature olefinic polymerization process in which a polymerization catalyst consisting of a Friedel-Crafts metal halide catalyst in solution in a halogenated alkane containing 1 to 3 carbon atoms per molecule and having a freezing point below −10° C., is used for the polymerization of an olefinic mixture consisting of from 1 to 60 weight percent of a conjugated diolefin having from 4 to 6 carbon atoms per molecule and from 99 to 40 weight percent of an iso-olefin, the improvement which consists of treating an impure halogenated alkane with about 1 to 50 weight percent of a liquid containing 1 to 30 grams of phosphoric anhydride per 100 cc. of tributyl phosphate, separating the purified halogenated alkane from the phosphoric anhydride solution, and thereafter dissolving in the treated halogenated alkane the Friedel-Crafts metal halide catalyst, and subsequently adding the resulting catalyst solution to said olefinic mixture and carrying out the polymerization at a temperature between −20° C. and −165° C.

8. A process according to that described in claim 7 in which the halogenated alkane is methylene chloride.

JOHN J. KOLFENBACH.
AUGUSTUS B. SMALL.

REFERENCES CITED

The following references are of record in the file of this patent:

UNITED STATES PATENTS

| Number | Name | Date |
|---|---|---|
| 1,825,814 | Norris | Oct. 6, 1931 |
| 2,433,025 | Calfee | Dec. 23, 1947 |

OTHER REFERENCES

Steinkopf et al., "Annalen der Chemie," vol. 424, page 19 (1921).